UNITED STATES PATENT OFFICE.

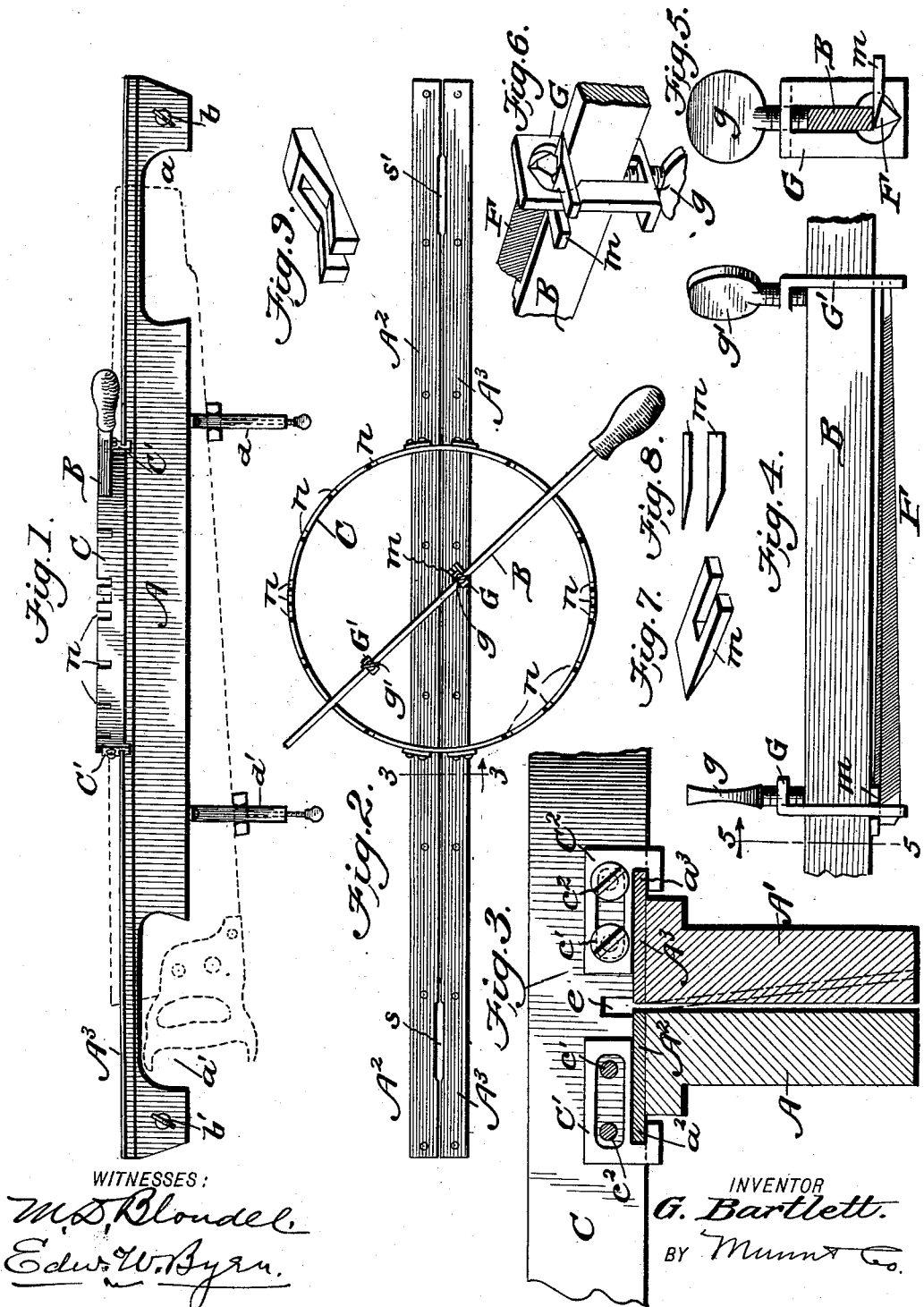

GRANVILLE BARTLETT, OF LEXINGTON, KENTUCKY.

SAW-FILING MACHINE.

SPECIFICATION forming part of Letters Patent No. 661,902, dated November 13, 1900.

Application filed July 26, 1900. Serial No. 24,944. (No model.)

*To all whom it may concern:*

Be it known that I, GRANVILLE BARTLETT, of Lexington, in the county of Fayette and State of Kentucky, have invented a new and useful Improvement in Saw-Filing Machines, of which the following is a specification.

My invention relates to saw-filing machines of that form in which a pair of clamp-bars hold the saw-blade with its teeth uppermost and a sliding carriage or guide frame for the file-holder is arranged to be moved longitudinally along the clamp-bars and has guide-seats in it to receive the file-holder in its reciprocating movement across the saw.

My invention consists in the peculiar construction of the saw-clamps, the peculiar construction of the file-holder guide or carriage, and in the peculiar means for adjusting the angular position of the file in regulating the inclination of the teeth to be cut, as will be hereinafter more fully described with reference to the drawings, in which—

Figure 1 is a side view of the device. Fig. 2 is a plan view. Fig. 3 is an enlarged section on line 3 3 of Fig 2. Fig. 4 is an enlarged detail, in side view, of the file-holder. Fig. 5 is a section on line 5 5 of Fig. 4. Fig. 6 is a perspective view of the file-adjusting devices, and Figs. 7, 8, and 9 are details of the back-bearing blocks for the file.

A A' represent the clamp-bars, which are made of wood cut out at $a$ and $a'$ on the under side near each end to accommodate the handle of the saw, while its blade is held between the intermediate portions, with its teeth projecting a little above the upper edge, as seen in dotted lines. Outside of the cut-away portions the wooden clamp-bars are somewhat deeper than at such cut-away portion to accommodate the reception of clamping-bolts $b$ $b'$, which hold the clamp-bars together. When the saw is being filed, the intermediate portions of the clamp-bars are held between the two jaws of any vise whose clamping effect at the same time pinches the clamp-bars on the saw-blade and rigidly holds it in place. The cut-away portions $a$ $a'$, as shown, exist at both ends to permit the saw to be reversed, if desired; but when the saw is not to be reversed the clamp-bars may be cut away at one point $a$ only.

The only object in reversing the saw is to permit the teeth to be filed in a special manner. Thus if its two clamp-bars are made with the space between them lying in a plane oblique to the vertical, as shown by dotted lines in Fig. 3, every alternate tooth of the saw can be first filed and the saw then removed and reversed and the intermediate teeth filed with an opposite slant. This will give a saw-tooth that does not have a right-angular chisel edge, but a sharp point with the alternate teeth beveled in the opposite direction. This form of tooth has the best cutting action.

The upper surfaces of the two clamp-bars A A' are faced with metal plates $A^2$ $A^3$, running the full length of the device and projecting over the edges of the wooden bars to form flanges $a^2$ $a^3$ at the sides, as seen in Fig. 3. These metal face-plates take the wear of the file-holder guide or carriage which is mounted thereon and also reinforce and strengthen the clamp-bars at the cut-away portions $a$ $a'$, and, further, afford means for holding the file-holder carriage down in place against rising and leaving the clamps.

C is the file-holder guide or carriage. This is made of a single bar of iron or steel of uniform transverse dimensions bent around into a circle and connected at the ends. In the upper edges of this carriage is a series of notches $n$, which are of a size to receive the file-holder bar B, which slides freely in the notches, and is provided with a handle at one end. By means of the notches $n$ the file-holder may be set to cross the saw at any desired angle.

To hold the guide-carriage onto the metal-faced surface of the clamps, there is attached to the circular carriage, at one or both points where it crosses the clamps, retaining-keepers $C'$ $C^2$, Fig. 3. These are hook-shaped metal plates which are detachably fastened to the curved carriage by screws $c'$ $c^2$, with their hooked ends underlapping the projecting metal edges of the face-plates of the clamps. These keepers are slotted, and the screws pass through said slots in such a way that said keepers may be adjusted to or from each other to suit the thickness of various saws and may also be adjusted vertically to raise them slightly if they should become loose from wear. Between these keeper-plates the lower edge of the circular carriage is slotted at e to allow the teeth of the saw to project up sufficiently to come within range of the file.

The file-holder bar B has two stirrups G G', which hold the file F and are secured to the bar by set-screws g g'. One of these stirrups G, which holds the butt of the file, has its slot next to the set-screw to closely fit the bar; but in the end which receives the butt of the file this slot is enlarged laterally (see Fig. 6) and has a V-shaped notch which receives one of the edges of the triangular file.

As the teeth of a saw have a forward lean, the two working sides of the file must be set to have a different inclination to the vertical, and this inclination needs to be adjustable at will. To accomplish this, I have a special form of back bearing for the file that lies between the file and the bar of the holder. It is a wedge-shaped block of metal, m, having a chisel-shaped or inclined edge at one side and a slot forming two branches on the other side. When the chisel-shaped end lies between the file and the bar, the back bearing for the file cants it to the proper inclination. When in place, this wedge-block has its two branches to straddle the stirrup, so that it cannot get out of place and lost. These wedge-block bearings are made in series, as seen in Fig. 8, of different angles of inclination to suit the inclination of the teeth to be filed and are interchangeable. In Fig. 9 is seen a further development of this bearing-block, in which two opposite inclines are formed on the same block. This adapts the inclination of the file to be changed by a single endwise adjustment of the block without taking it out.

To apply the saw to the clamp, the carriage is first slid off and the saw is inserted in the clamp in a vertical position from underneath at one of the cut-away portions a or a', with the handle of the saw down and the teeth on the outer edge. When the handle rises to the cut-away space a or a', the outer end of the saw is swung down ninety degrees to a horizontal position. The saw is then leveled to the proper position by subjacent set-screws d d', tapped in yokes attached to the clamps, and the saw is then tightened in the clamp by being put in a vise, and the circular carriage is then slipped on the flanged metal facing of the clamp-bars and the file-holder applied to the carriage in such of its guide-notches as to give the proper angle of cut for the saw-teeth.

At s s', Fig. 2, the adjacent edges of plates $A^2$ $A^3$ are cut away to give passage to the saw-teeth in inserting and removing the saw, so that the teeth may not be damaged by the metal plates.

In defining my invention with greater clearness I would state that I am aware that a file-holder sliding in a circular guide frame or carriage is not broadly new. My invention is distinguished by the fact that the carriage is cheaply made of standard metal bars slotted by punching it in one operation. It gives a bearing for the file-holder a long distance away from the saw, giving great accuracy of alinement and leaving an unobstructed view of the saw-teeth.

Having thus described my invention, what I claim as new, and desire to secure by Letters Patent, is—

1. A saw-filing machine comprising two wooden clamp-bars having on their upper faces metal face-plates projecting over the sides of the clamp-bars to form retaining-flanges, a carriage with guides for the file-holder and hook-shaped keepers connected to the carriage, and hooking under the metal edges of the said face-plates substantially as described.

2. A saw-filing machine comprising two wooden clamp-bars cut away near one end from the under side and having a clamp-bolt beyond the cut-away portions, two metal face-plates extending the full length of the clamp-bars and their cut-away portions, a file-holder carriage sliding on said face-plates, and keepers connecting them together substantially as described.

3. In a saw-filing machine, the wooden clamp-bars having metal face-plates with a cut-away space between the adjacent edges of the face-plates near one end to permit the passage of the teeth of the saw when inserting and removing the latter substantially as described.

4. In a saw-filing machine, the combination with a subjacent saw-clamp; of a file-holder guide riding on said clamp, and constructed simply of a metal bar of uniform transverse dimensions slotted transversely at the edges to give passage to the file-holder and the saw, and bent around in circular form and wholly open within its circle, and retaining devices for holding it upon the clamps substantially as described.

5. In a saw-filing machine, the combination with a subjacent saw-clamp having projecting metal face-plates; of a file-holder guide or carriage riding on said face-plates and constructed of a metal bar of uniform transverse dimensions slotted transversely at the edges to give passage to the file-holder and the saw, and bent around in circular form, and hook-shaped metal keepers secured to the circular carriage and locking under the projecting edges of the metal face-plates substantially as described.

6. The combination with the file-holder bar its stirrup and the file; of a back bearing for the file constructed as a wedge-block slotted in the side opposite its beveled edge and having its branches embracing the stirrup substantially as described.

7. The combination with the file-holder bar, its stirrup and the file; of a back bearing for the file constructed with two reversely-inclined faces, and a slotted side embracing the stirrup substantially as and for the purpose described.

GRANVILLE BARTLETT.

Witnesses:
SOLON C. KEMON,
AMOS W. HART.